June 4, 1940.   S. F. DUPREE, JR   2,203,525
SEALING MEANS FOR SHAFTS
Filed Aug. 4, 1936   9 Sheets-Sheet 1

INVENTOR.
Samuel F. Dupree, Jr.
BY
Hull, Brock & West
ATTORNEYS

June 4, 1940.  S. F. DUPREE, JR  2,203,525
SEALING MEANS FOR SHAFTS
Filed Aug. 4, 1936    9 Sheets-Sheet 7

Fig. 24.

INVENTOR.
Samuel F. Dupree, Jr.
BY Hull, Brock & West
ATTORNEYS.

June 4, 1940.　　　　S. F. DUPREE, JR　　　　2,203,525
SEALING MEANS FOR SHAFTS
Filed Aug. 4, 1936　　　　9 Sheets-Sheet 8

INVENTOR.
Samuel F. Dupree, Jr.
BY
Hull, Brock West,
ATTORNEYS.

Patented June 4, 1940

2,203,525

UNITED STATES PATENT OFFICE 2,203,525

SEALING MEANS FOR SHAFTS

Samuel F. Dupree, Jr., Shaker Heights, Ohio

Application August 4, 1936, Serial No. 94,203

10 Claims. (Cl. 308—36.2)

This invention relates to means for supporting and for sealing against leakage the shafts of pumps or similar devices used for the circulation of fluids. While there is a large field for the use of my invention in connection with pumps employed for circulating water for engine-cooling purposes, it is capable of use in other fields wherein a liquid or a gas is to be circulated under low or high pressures.

As is well known to those skilled in the art to which my invention relates, the shafts and the bearings therefor as well as the sealing elements and the cooperating metal shoulders are the parts which are most liable to destructive wear in the operation of rotors or impellers which are used for the circulation of liquids; the pump bodies do not wear out, but the rotors or impellers are subject to deterioration by acids and other chemicals in the water, and when such deterioration occurs replacement is necessary.

In all forms of water circulating pumps in common use, one of the great difficulties encountered in servicing or repairing the same is the inability of the average person to press the bearings in place within a pump body so that they may be properly squared with the shaft and aligned thereon, and without closing in the bores or openings through the bearings thereby to produce a tight fit on the shaft, which will result in the production of squeaks.

I overcome the foregoing difficulty and others which will be pointed out hereinafter generally as follows: I construct a unit which includes the bearings, the sealing elements and, in most instances, the shaft. The bearings are placed within a housing, which can be press-fitted or otherwise secured within a seat provided by and within the bore of a pump body. By constructing a service unit in this manner, the bearings can be installed within the housing under factory supervision, whereby all limits can be properly maintained, so that the unit by which the pump is serviced will be in every respect equivalent to, and in many instances superior to, the original unit. Furthermore, the replacement of the parts which are most liable to wear may be effected quickly, conveniently and efficiently.

In the practice of my invention, one of the sealing elements (preferably a Bakelite ring) and the cooperating metallic sealing element or shoulder are also removable and replaceable as a unit, while in the present constructions of so-called "packless" pumps, it is possible only to renew this sealing ring, because the metallic sealing element is formed as part of the pump body and cannot be replaced without supplying an entire new body.

Furthermore, in the practice of my invention, I have, in some of the embodiments shown herein, removed the spring sealing element from the fatiguing influence of hot and cold water. When subjected to this fatiguing influence for a considerable time, these springs fail in their function of pressing the sealing ring against the metallic sealing element or shoulder.

The foregoing objects and advantages of my invention, as well as others which will be pointed out hereinafter, are realized by the construction and arrangement of parts shown in the annexed drawings, wherein.

20 a detail in sectional elevation of the inboard end of the unit shown in Fig. 16 and illustrating a modification of the sealing ring shown in the former figure.

Describing by reference characters the various parts shown in Figs. 1-5, inclusive, 1 represents a pump body detachably secured to the wall 2 of a liquid containing chamber, which may be the water jacket of an internal combustion engine. The pump body is shown as provided with a chamber 3 communicating at its bottom with the water jacket and with an outlet 4 for delivering the water to the radiator. The pump body is provided with a cylindrical bore 5 providing a seat for the housing 6 of my unit. Mounted within the housing and extending beyond the outboard end of the same is the outboard bearing bushing 7, the said bushing being engaged at its outboard end by the hub 8 on the driving pulley 9. The inboard end of the housing 6 is provided with a bore 6x of smaller diameter than that which receives the bushing 7, and mounted within the said reduced portion is the bearing bushing 10. The bushings 7 and 10 may be of any suitable material and within which the shaft 11, 11a revolves.

Figure 1:
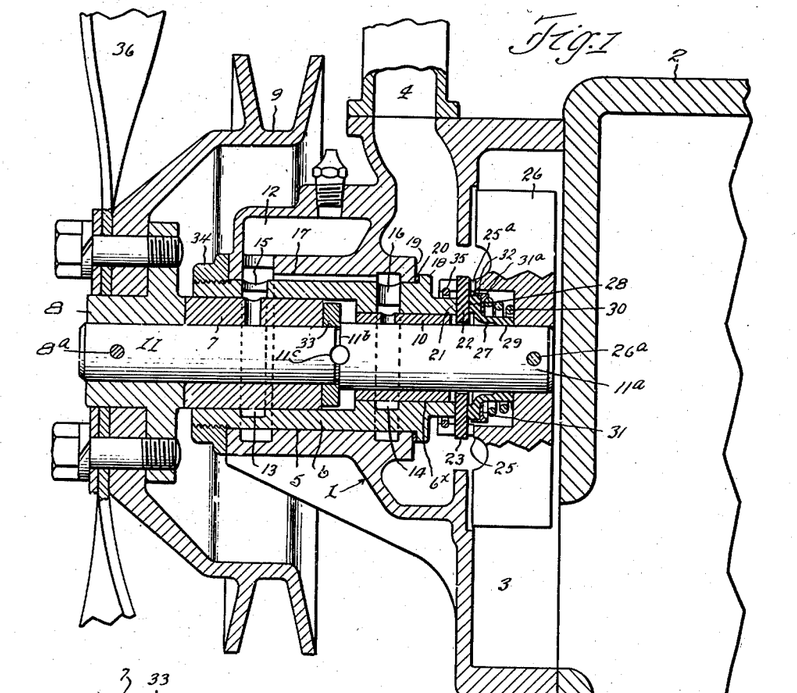
Fig. 1 represents a longitudinal vertical sectional view through a pump body having my invention applied thereto, the pump body being shown as applied to and used in connection with the water circulating system of an automobile.
Figures 6, 7, 8:
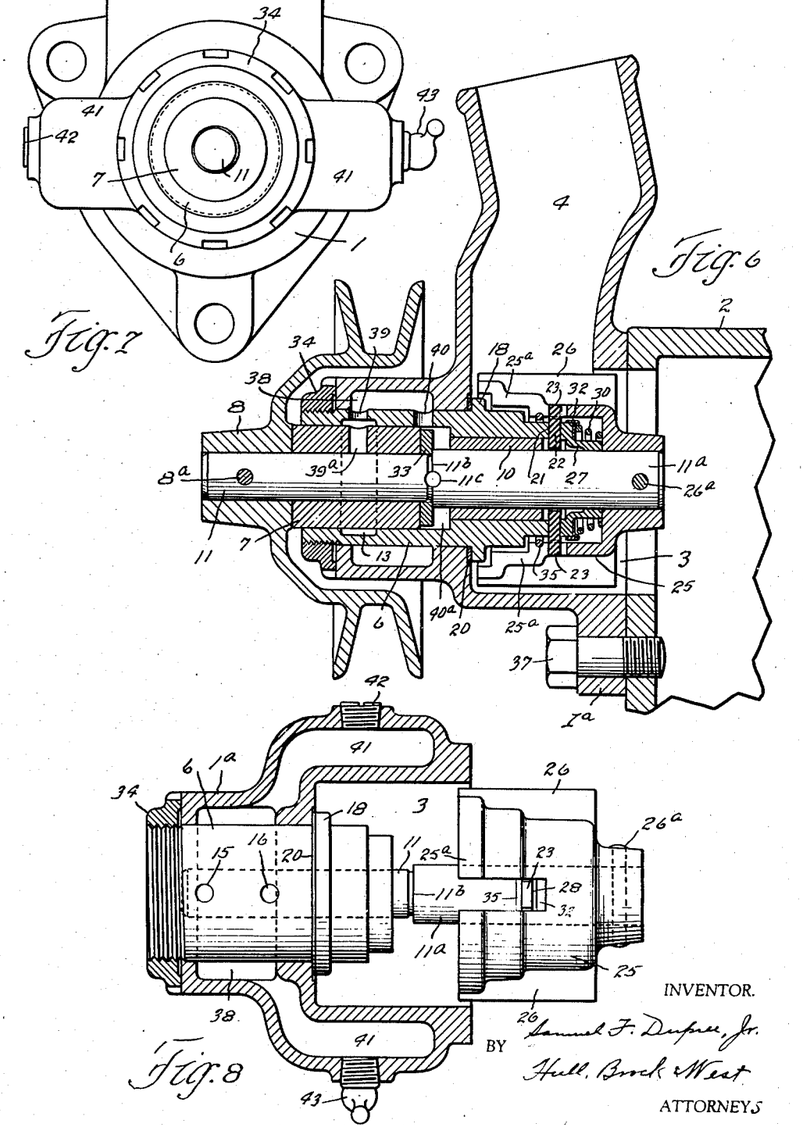
Fig. 6 a view similar to Fig. 1 showing a modification of the construction shown in the former view.
Fig. 7 a front elevation of the portion of the pump housing and my sealing unit, the driving pulley being removed.
Fig. 8 a horizontal sectional view through the pump housing, showing my unit therein the shaft having been partly withdrawn from the housing.

The pump body is provided with a lubricant reservoir 12 from which an adequate supply of lubricant is delivered to the bearings 7 and 10 by means of the annular chambers 13 and 14, which surround the said bearings respectively and to which lubricant from the reservoir 12 is delivered by the ports 15 and 16 and the connecting passage 17 shown as formed jointly within said body and said housing. The housing 6 is provided, near its inboard end, with a radially outwardly projecting flange 18, between which and the annular surface 19 at the inboard end of the pump body a suitable packing ring or washer 20 is inserted. The inboard end of the housing 6 projects beyond the bearing bushing 10 and is provided with an annular shoulder 21 which shoulder is engaged by a sealing ring preferably made of material known to the trade as Bakelite or "Micarta" and having driving projections 23 provided between slots 24 (see Fig. 17) whereby the ring may be driven by projections 25a provided by slotting the inboard end of the hub 25 which carries a rotor or impeller 26. Within a casing formed within the said hub a sealing ring 27 is located, this sealing ring having an outboard annular surface 28 adapted to be pressed against the inboard face of the washer 22 and having a bore 29 adapted to fit closely about the shaft 11. This ring will be made preferably of a deformable and resilient rubber composition known to the trade as "Duprene." A spring 30 presses the outboard sealing surface of the ring 27 against the ring 22 through a washer 31 which is preferably T-shaped in section, whereby a retaining shoulder 31a is provided for the outboard end of the spring and a retaining ring 32 is provided to limit outward expansion of the portion of the sealing ring which engages the washer 22, see Fig. 14. It will be noted that the shaft shown in both Figs. 1 and 6 is one wherein the outboard portion 11 is of smaller diameter than the inboard portion 11a, thereby providing an annular shoulder 11b between said portions. The inboard end of the bushing 7 abuts against the outboard face of a thrust ring 33 the inboard end of which abuts against the shoulder 11b. The thrust ring is driven by means of diametrically opposed lugs 33a projecting from said ring, the inner ends 33b of said lugs projecting from the inboard surface of the ring and entering arcuate slots 11c in the adjacent enlarged portion of the shaft, see Figs. 2-5. The thrust ring compensates for thrusts such as may be exerted upon the shaft by the pulley 9 and the fan 36.

It will be noted that the impeller is pinned to the shaft at 26a and the hub 8 is pinned thereto at 8a. The housing 6 and the parts therewithin are shown as secured within the pump body by means of the locking and adjusting ring 34 which is threaded onto the outboard end of the housing and bears against the outboard end of the pump body. By suitably adjusting the ring 34, the packing and sealing washer 20 will be tightly compacted between the flange 18 and the part 19 of the pump body, thereby preventing access of liquid to the interior of the housing.

Prior to assembling the housing and impeller in the relation shown, the sealing elements comprising the ring 22, ring 27, spring 30 and washer 31 may be conveniently retained within the casing formed within the impeller hub by means of an outwardly expanding snap ring 35 fitted within a recessed seat provided within the outboard ends of the hub projections 25a.

The embodiment of my invention described hereinbefore is particularly adapted for use with shafts and pump bodies such as are employed in one of the well known makes of automobiles in use and wherein the cooling fan 36 is mounted on the shaft, being secured to the hub 8. The housing 6 with the bearings therein can be applied to an existing pump body such as are now used with these automobiles by merely enlarging the cylindrical bore 5 sufficiently to receive the housing and by providing the body with the longitudinal passage 17 and the port 16. Furthermore, the housing and bearing assembly may be very conveniently applied to the particular shaft shown herein; and the shaft, with this assembly thereon and with the impeller and sealing elements attached thereto, can be quickly and conveniently assembled as a unit within the pump body.

In Figs. 6, 7 and 8, there is shown a modification of my invention, which is adapted for use with the pump bodies of another well known make of automobile. The main differences between the embodiment of my invention as shown in these views and the one shown in the preceding views are as follows: The rotor or impeller and its hub are somewhat different from those shown in the preceding views, but this difference is not sufficiently important to necessitate designating the parts thereof with different numerals than are applied to the corresponding parts in the preceding views. The pump body in this case is shown as secured to the wall of the chamber 2 by means of a flange 1a and bolts, one of which is designated 37, and is provided with an annular reservoir 38 extending entirely around the housing 6 and delivering an adequate supply of lubricant to the bushings 7 and 10 and the shaft 11 by means of ports 39 and 40 communicating directly with opposite ends of the upper portion of the said reservoir. Lubricant is supplied through the port 39 to the chamber 13 formed within the housing 6 and surrounding the bushing 7 and between the bushing and the shaft 11 by one or more ports 39a; and lubricant is supplied through the port 40 to a chamber 40a containing the thrust ring 33 and thence between the bushing 10 and the shaft 11a. The lubricant chamber 38 is in turn supplied with lubricant through either one of the two oppositely disposed branches 41, which are provided each with a plug 42, 43. These plugs are interchangeable, the plug 43 being readily removable. This arrangement of the lubricant supply branches is particularly applicable to motors of the V-8 type, since it enables the pump bodies to be used interchangeably with the water jackets of said motors, as the plug 43 may be transposed with the plug 42 where necessary to enable lubricant to be introduced conveniently into the appropriate receptacle 41.

As is the case with the use of the unit shown in the preceding views, existing pump bodies such as shown in Fig. 6 can be adapted for the reception of my unit by merely enlarging the internal diameters of the appropriate portions of the pump body to a sufficient extent to provide a seat for the reception of the housing 6.

In Figs. 9-13 inclusive there is shown a modification of my invention which is applicable to the same general type of pump body as shown in Figs. 1 and 6. The parts which are substantially identical with those in the former embodiments of my invention will be designated by the same reference characters. In this modification, however, the bearings and the sealing elements are all contained within the external housing 6a. The shaft 11x is of the same diameter throughout its length and is supported within the housing 6a by an outboard ball bearing and an inboard spool-shaped bushing. The ball bearing comprises the outer race 44, the inner race 45, and the balls 46. The outboard end of the inner race bears against the hub 8; and the outboard end of the space between the said races is sealed by a composite ring 47, 48, held in place by a snap ring 49 (see Figs. 14 and 16) while the outer race is retained in place by means of a snap ring 50 fitting within a groove near the outboard end of the housing 6a. The inboard end of the inner race is engaged by a locking ring 51 fitted within a groove 52 in the shaft. The inboard bearing comprises the spool-shaped bushing 53 the flanges of which engage the inner wall of the housing 6a, there being a chamber 54 provided between said flanges, the housing and the hub of the bushing, with ports 55 extending through the said hub to supply lubricant from said chamber between the bushing and the shaft.

Figures 9, 10, 11, 12, 13:
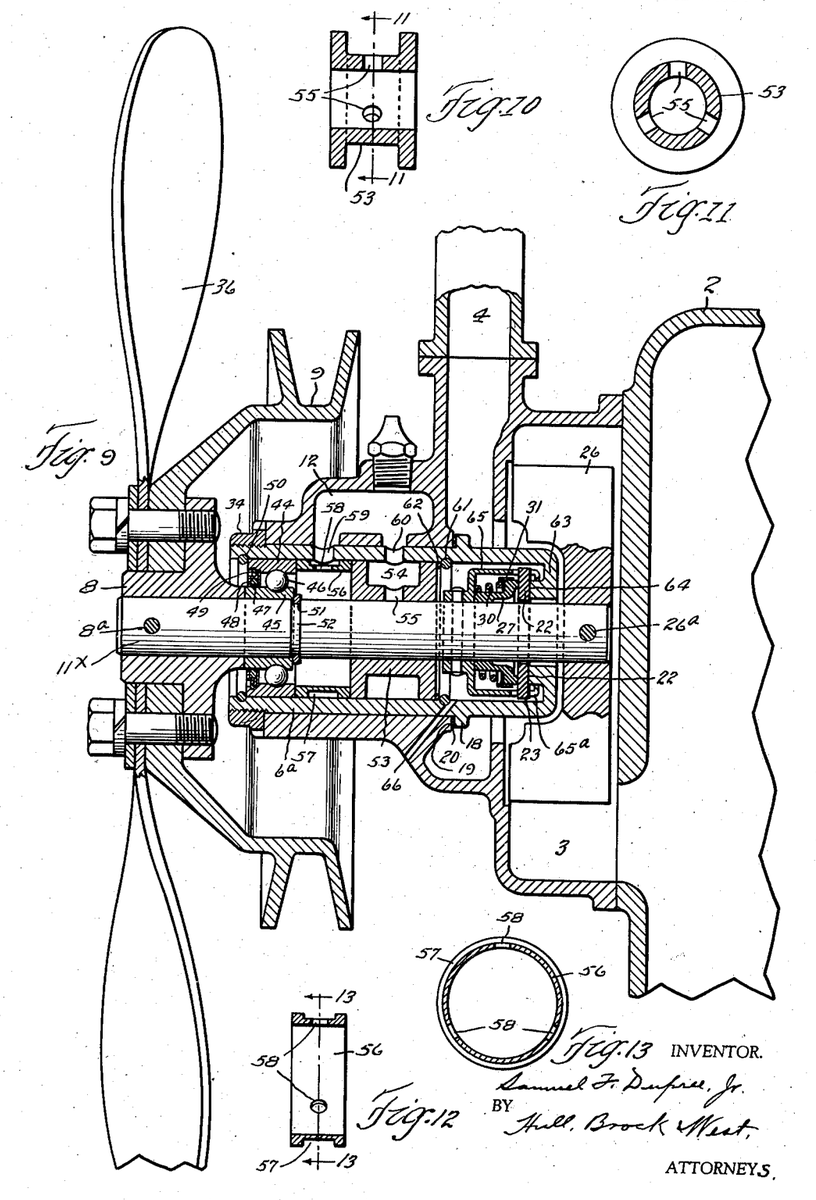
Fig. 9 a view, similar to Figs. 1 and 6, showing a modification of the invention illustrated in Figs. 1 and 6.
Fig. 10 is a detail in longitudinal section through the sleeve bearing of Fig. 9.
Fig. 11 is a sectional view corresponding to the line 11—11 of Fig. 10.
Fig. 12 a detail in longitudinal section through the spacer ring shown in Fig. 9.
Fig. 13 is a sectional view corresponding to the line 13—13 of Fig. 12.

56 denotes a spacing sleeve interposed between the inboard end of the outer race 44 and the outboard flange on the bushing 53. This ring is provided with a channel 57 extending therearound and forming an annular lubricant chamber which communicates with the chamber formed within the said ring and between the bushing 53 and the ball bearing, by means of ports 58, thereby to supply lubricant to the ball bearing. The ports 58 and the chamber 54 receive lubricant from the receptacle 12 through ports 59 and 60, respectively.

The bushing 53 is held in place with its outboard flange pressed against the inboard end of the spacer 56 by means of a snap ring 61 mounted within a groove in the inner wall of the housing 6a and a washer 62 interposed between the said snap ring and the inboard flange of the bushing.

As is the case with the preceding embodiments of my invention, the housing is provided with the flange 18, and a washer 20 is inserted between the said flange and the cooperating surface 19 of the pump body. In this form of my invention, however, the inboard end of the housing is provided with a radially inwardly projecting wall 63 which extends nearly to but not in contact with the shaft and which is provided with an annular shoulder having a sealing surface 64 which constitutes a sealing element which cooperates with the ring 22 shown in the preceding embodiments of my invention. In the form of my invention shown in Fig. 9, a cup or casing 65 is pinned to the shaft, the said cup having driving fingers 65a adapted to engage the driving lugs 23 on the ring 22, and the sealing ring 27 surrounds the shaft within the said casing and engages the outboard face of the former ring and is pressed thereagainst by the spring 30 and the washer 31. The sealing elements 22, 27, 30 and 31 are retained within the casing 65 prior to securing the casing to the shaft by the ends of the fingers 65a, which are bent radially inwardly, as shown. This facilitates the assembly of these elements upon the shaft; and by the construction and arrangement of the sealing elements water can have access only to the inboard end of the shaft and to the sealing rings 22 and 27, the spring 30 being protected against such access. However, as condensation is liable to occur within the inboard end of the housing, a drain port 66 is provided for the chamber therein, the said port extending through the pump body.

Figures 14, 22:
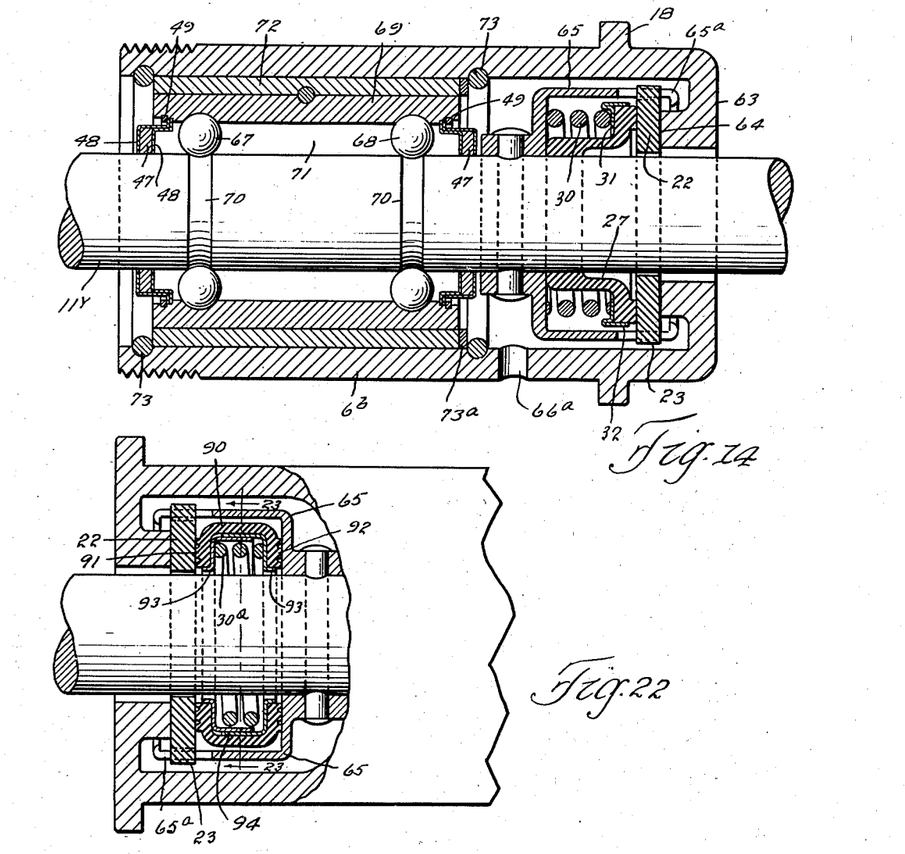
Fig. 14 a longitudinal vertical sectional view through another modification of my unit, the shaft being shown in elevation.
Fig. 22 a view similar to Fig. 20, showing a still different form of sealing ring and Fig. 23 a detail in section corresponding to the line 23—23 of Fig. 22.

In Fig. 14 there is shown a modification of the unit illustrated in Figs. 9-13 inclusive and wherein, instead of using an outboard ball bearing and an inboard bushing, two ball bearings 67 and 68 are employed, with a common outer race 69, the inner races being provided by grooves 70 extending around the shaft 11y. In this form of my invention, the housing is shown at 6b, being provided at its outboard end with an external thread for the reception of a locking ring, as before. It is also provided with the sealing flange 18 and with a chamber 71 adapted to receive lubricant and to supply the same to the ball bearings. The outboard and inboard ends of the ball bearings are sealed by the composite sealing rings 47, 48 and the snap locking ring 49 referred to hereinbefore. The composite sealing rings consist each of a pair of sheet metal plates 48 having suitable packing material 47 interposed therebetween, which packing material bears against the shaft 11y, while the radially outer edges of the metal plates are mounted within a seat formed within the outer race, being engaged by the locking ring 49 also mounted in the outer race. The outer race is received within and pinned to a sleeve 72 which is mounted within the housing 6b; and the outer race and sleeve are secured within the housing by the snap rings 73 and washer 73ᵃ. The inboard end of the housing and the arrangement of the sealing elements with respect thereto are identical with those shown in Fig. 9; and these parts are therefore identified by the same numerals which appear on Fig. 9. The chamber containing the sealing elements is provided with a drain port 66ᵃ. It is obvious that the bearings shown in Figs. 9 and 14 are interchangeable.

Figure 15:
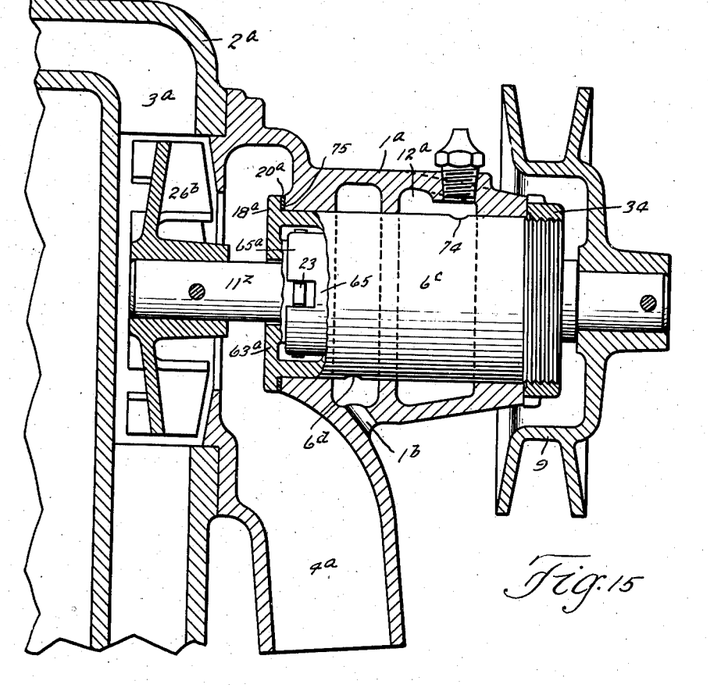
Fig. 15 a longitudinal vertical sectional view through a pump body showing a modification of my invention applied thereto.

In Figs. 15–23 I have shown other forms of my invention wherein the sealing elements are located within the housing which contains the bearings; and in Fig. 15 I have shown how any of these last embodiments of my invention may be mounted within a pump body, but with the sealing elements located outside the water circulating system. In the last mentioned view, the pump body 1ᵃ is shown as provided with a lubricant reservoir 12ᵃ for the purpose of supplying lubricant to the bearings within the housing 6ᶜ through a port 74. The inboard end of the housing 6ᶜ in this case is provided with a flange 18ᵃ between which and an annular surface 75 on the inboard end of the housing portion of the pump body there is inserted the packing washer 20ᵃ. The outboard end of the housing 6ᶜ is threaded as before, and a tight seal is effected between the parts 18ᵃ and 75 by means of the ring 34. On the inboard end of the shaft 11ᶻ is mounted an impeller 26ᵇ located within a chamber 3ᵃ in the wall 2ᵃ of the water jacket of an internal combustion engine.

Figures 16, 17, 18, 19:
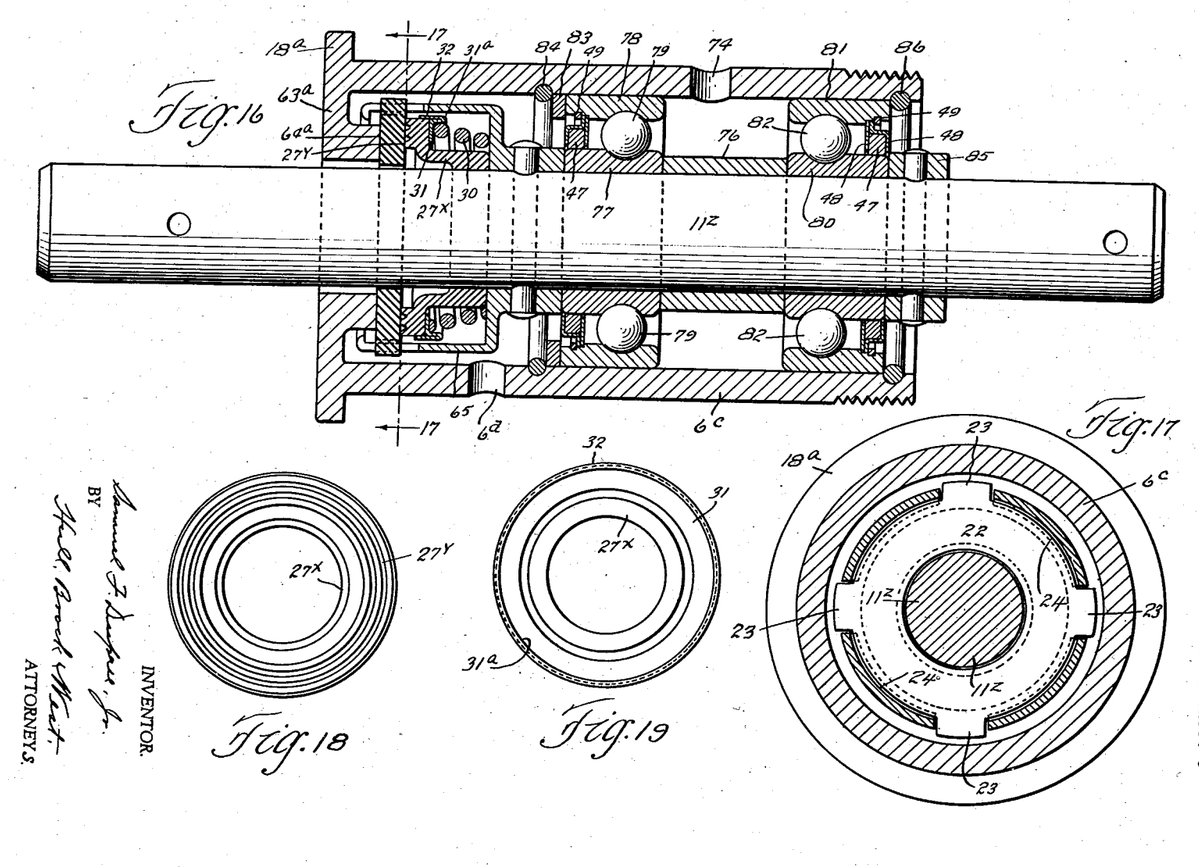
Fig. 16 is a longitudinal sectional view through the unit shown in Fig. 15, the shaft being shown in elevation.
Fig. 17 a detail in section corresponding to the line 17—17 of Fig. 16.
Figs. 18 and 19 are details in elevation of the sealing rings shown in Fig. 16, the views being taken from opposite ends of the ring; Fig.

In Fig. 16 there is shown in detail the shaft and the unit housing and bearing and sealing elements employed in the assembly shown in Fig. 15. As will be noted, the inboard end of the housing is formed in substantially the same manner as the inboard end of the housing shown in Fig. 9, being provided at its inboard end with a wall 63ᵃ projecting inwardly toward but not in contact with the shaft 11ᶻ and having the shoulder with the annular sealing surface 64ᵃ for engagement by the ring 22. This ring and the ring 27ˣ and the spring 30 and the washers 31, 31ᵃ, 32 are substantially identical with the correspondingly designated parts in Fig. 9 and are located within a cup 65 identical with that shown in the preceding view. The only difference in construction is that the inboard face of the ring 27ˣ which engages the ring 22 is corrugated, as shown at 27ʸ.

Within the housing 6ᶜ are two ball bearings, spaced apart by an intermediate sleeve 76, there being an annular chamber for lubricant provided between the said sleeve and the interior of the housing. 77 denotes the inner race, 78 the outer race and 79 the balls of the inboard ball bearing, the corresponding parts of the outboard ball bearing being designated by the numerals 80, 81 and 82, respectively. The inboard end of the inboard ball bearing and the outboard end of the outboard ball bearing are sealed in the same manner as the inboard and outboard ends of the ball bearings shown in Fig. 14, the sealing members being designated by the same numerals that are employed in the former view. The inboard end of the inner race 77 of the inboard ball bearing abuts against the hub of the driving cup or casing 65 and the inboard end of the outer race 78 of said bearing is engaged by a ring 83 which is held in place by a snap ring 84 mounted in a groove in the housing. The outboard end of the inner race 80 of the outboard ball bearing engages a ring 85 pinned to the shaft 11ᶻ, while the outboard end of the outer race 81 of said outboard bearing is engaged by the snap ring 86. The housing is provided with a drain port 6ᵈ whereby any liquid of condensation formed in the chamber containing the sealing elements may be delivered outside the pump body through the port 1ᵇ.

Figure 20:
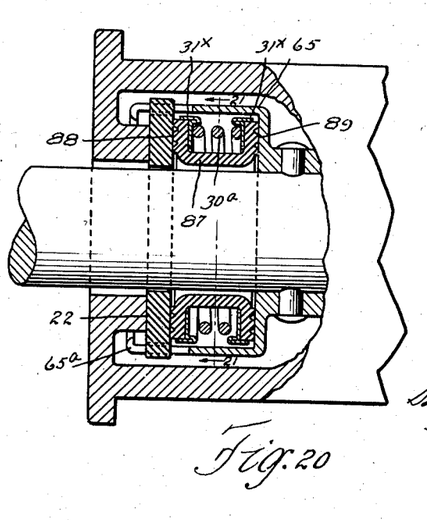

In Fig. 20 there is shown a modification of the "Duprene" sealing ring employed in the previous embodiments of my invention. Instead of using a ring generally angular in section, the ring 87 is channelled in section, having opposed corrugated faces 88, 89 adapted to engage respectively the inboard face of the ring 22 and the bottom wall of the cup or casing 65. In this case, two washers 31ˣ are employed, being inserted between opposite ends of the spring 30ᵃ which presses the surfaces 88 and 89 against the ring 22 and the bottom of the casing.

Figure 21:
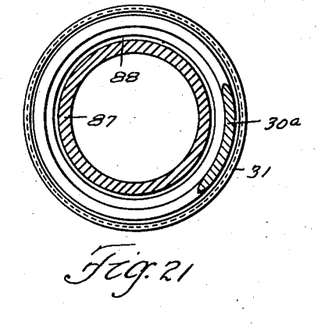
Fig. 21 a detail in section corresponding to the line 21—21 of Fig. 20.
Figure 23:
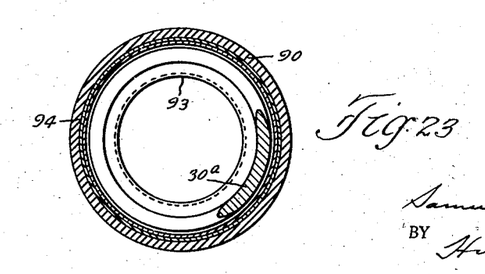

In Figs. 22 and 23 there is shown a still further modification of the construction of the "Duprene" sealing ring which differs from that shown in Figs. 20 and 21 in that the channel is reversed; that is to say, the sides of the channel extend radially inwardly from the bottom of the same. In these views, 90 denotes the base of the channel, 91 and 92 the radially inwardly extending sides, which are corrugated (as is the case with the forms shown in Figs. 16 and 20) and which engage respectively the outboard face of the ring 22 and the bottom of the casing 65. With this form of ring I employ a special washer construction in place of the washers 31. Each washer comprises a cylindrical flange 93, which flanges engage the inboard edges of the sides 91 and 92; and each washer has a cylindrical base 94, these cylindrical bases being telescoped one within the other and the outer of said bases preferably engaging the bottom of the casing 90. The spring 30ᵃ forces these washers apart and presses the sides 91 and 92 of the "Duprene" ring into engagement with the cooperating surfaces.

Figure 24:
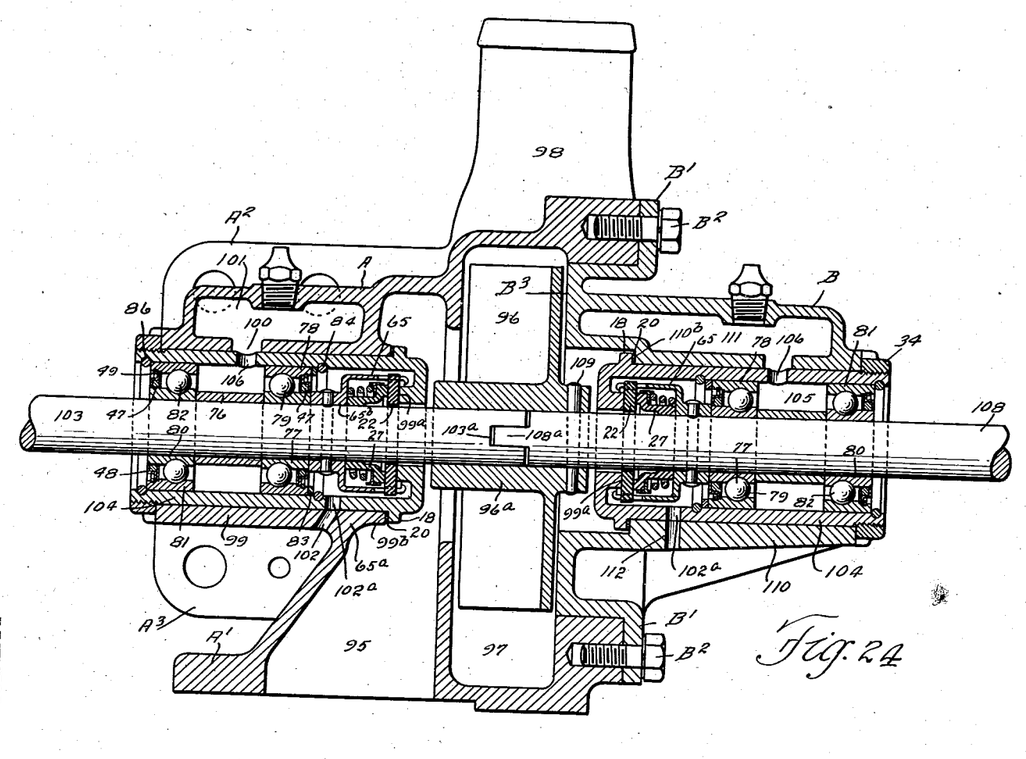
Fig. 24 a longitudinal sectional view through a pump, the shaft whereof is provided with duplex bearing and sealing units employing my invention.

In Fig. 24 there is illustrated the manner in which my invention may be incorporated in the body of a power pump, wherein the fluid moving part of the pump is located within a central chamber within the pump body. In this view, the pump body consists generally of two sections A and B, the left hand section A having a base A′ provided with an inlet port 95 for the water or other fluid to be circulated by the blades 96 of the pump. The body section A is also shown as provided with upper and lower flanges A² and A³ whereby the body may be secured, for instance, against the wall of a chamber adapted to contain or receive fluid circulated by the pump.

Fluid entering the body through the port 95 is received within the chamber 97 containing the pump and is delivered from said chamber to an outlet, indicated at 98.

At its left-hand end, the body section A is provided with a sleeve 99 having a bore forming a seat for one of my units and having a port 100 in the upper wall thereof communicating with a lubricant receptacle 101 and provided in the bottom with a port 102 cooperating with a port 102ᵃ in the wall of the housing for the bearing and sealing elements, for the purpose of delivering liquid of condensation from the chamber containing said elements. Within the sleeve 99 there is mounted one of my units, said unit comprising a shaft section 103, a housing 104 enclosing said shaft section, and bearing and sealing elements within the housing and surrounding the shaft section, the construction and arrangement of the bearing element being similar to those shown in Fig. 16 and the elements whereof are designated by the same reference characters as are applied to the parts of the bearing in the former view.

The housing is provided with a port 106 communicating with the chamber 101 through the port 100 and delivering lubricant from said chamber into the annular chamber provided between the ring 76 and the housing and thence to the ball bearings. The inboard end of the inner race 77 is engaged by the hub 65ᵇ of the casing 65 which contains the sealing elements, which are shown as identical with those illustrated in Fig. 9 and which are identified by the same numerals that are applied to said elements in the former figure. It will be noted that the ring 22 engages the annular sealing surface 99ᵃ on the shoulder projecting in an outboard direction from the inboard wall of the housing. The housing is also provided with the flange 18 cooperating with the sealing washer 20 and the annular sealing surface 99ᵇ on the inboard end of the sleeve 99. The chamber containing the sealing elements is provided with the port 102ᵃ registering with the port 102 and cooperating therewith to permit the drainage of condensation from said chamber. The inner inboard end of the shaft section 103 is received within the hub 96ᵃ of the impeller and is provided with a mortise 103ᵃ for the reception of the tenon 108ᵃ on the shaft section 108 to which the impeller hub is secured, as by the pin 109.

The right hand section B of the pump body is provided with a flange B' whereby it is detachably secured to the section A by means of bolts B². It is provided at its inboard end with a wall B³ forming part of the central chamber within which the pump blades rotate. It is also provided with a sleeve 110 which receives therewithin the shaft section 108 and the housing containing the bearings in which the said section is mounted, also the sealing elements. The unit comprising the housing, the bearings, and the sealing elements is identical with the one which has been described in connection with section A; and the said housing and the parts therewithin are designated by the same numerals which are applied to the former housing and the parts therewithin. The lubricant chamber 105 receives lubricant for the ball bearings through the port 106 from a lubricant reservoir 111 in the body section B, and the latter section is provided with a port 112 which registers with the port 102ᵃ for the purpose of removing water of condensation. The clamping and adjusting ring 34 is applied to the outboard end of each of the housings 104 and serves, by its adjustment, to secure an effective seal between the parts 18, 20 and 99ᵇ on the one hand and between the parts 18, 20 and 110ᵇ on the other hand.

The construction shown in Fig. 24 possesses all of the advantages, in a "duplex" arrangement of shafts, bearings and sealing elements, that are possessed by the single assemblies of shafts, bearings and sealing elements described hereinbefore; and each unit comprising a housing and the shaft and the bearing and sealing elements is capable of being used with an impeller or rotor and to be interchanged with the units shown in Figs. 9 and 14.

Figure 25:
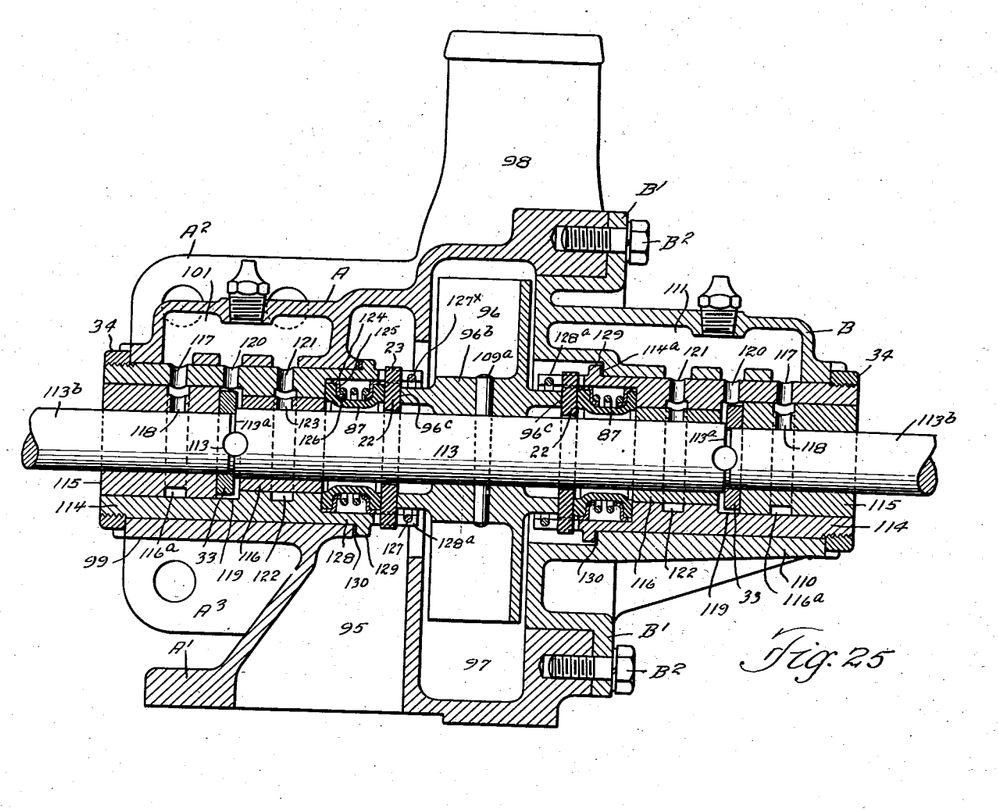
Fig. 25 a view, similar to Fig. 24, showing a modification of the shaft structure and of the bearing and sealing units.

Fig. 25 is a view, similar to Fig. 24, showing a pump body similar to that shown in the former figure, but with a continuous shaft extending through the body and having applied thereto and within the supporting seats of the body a further modified construction and arrangement of housings and bearings, with sealing elements arranged in substantially the same manner as shown in Fig. 20. The pump body construction being substantially identical with that shown in Fig. 24, the parts thereof are designated by the same numerals that are applied to the corresponding parts in the former figure. The hub 96ᵇ of the impeller proper in this case is secured at its central portion to the shaft by a pin 109ᵃ and is provided at each end thereof with an annular shoulder having a bearing surface 96ᶜ. Each of these surfaces cooperates with a ring 22 which, in this case, is held against rotation, as will be shown hereinafter.

As pointed out hereinbefore, the shaft 113 is a continuous shaft and, as illustrated, the central portion thereof is of greater diameter than the end portion 113ᵇ; each half of the shaft is con- between each end of said central portion and an end portion 113ᵇ; each half of the shift is constructed in the same manner as the shafts shown in Figs. 1 and 6.

Figures 2, 3, 4:
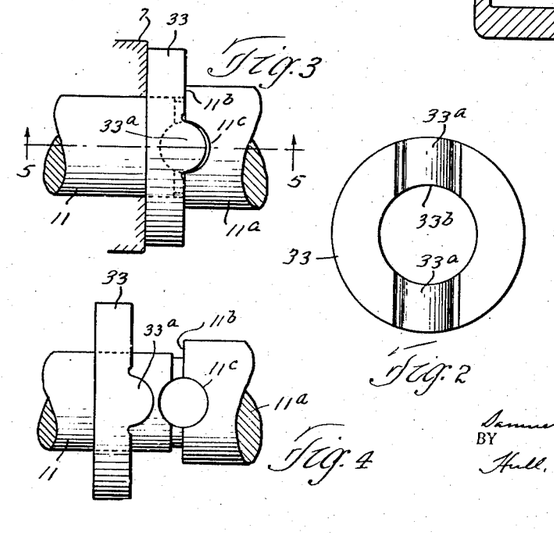
Fig. 2 an elevation of a thrust ring which is used with the shaft shown in Fig. 1.
Fig. 3 a detail in elevation of a portion of the shaft, the thrust ring being in its operative position.
Fig. 4 a view similar to Fig. 3 showing the thrust ring separated from the part of the shaft with which it normally cooperates.
Figure 5:
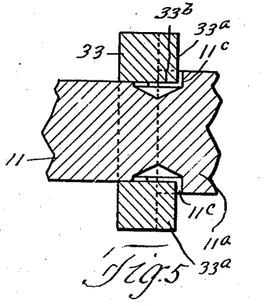
Fig. 5 a detail in section corresponding to the line 5—5 of Fig. 3.

Mounted within the bores or seats within the pump body sleeves 99 and 110 are identical units, each comprising a housing 114 having its outboard end threaded for the reception of the locking and adjusting ring 34 and each provided with an outboard bearing bushing 115 surrounding the correspondingly reduced outboard portion of the shaft and an inboard bearing bushing 116 surrounding the enlarged portion of the shaft, with a thrust ring 33, identical with the like-designated thrust ring in Figs. 1, 3 and 6 and having lugs 33ᵃ (not shown) adapted to enter driving recesses (not shown) in the enlarged central portion 113 of the shaft. Each bushing 115 is provided with a channel 116ᵃ extending therearound and forming an annular chamber for the reception of lubricant from the receptacle 101 through the port 117, from which annular chambers the lubricant is delivered to the bearings between the bushings and shaft by means of one or more ports 118. Lubricant is also delivered to each annular chamber 119 which encloses a thrust ring 33 and from said chambers to said rings and to the bearings between the bushings 116 and the shaft 113, the chambers being supplied from the receptacle 101 by ports 120. In addition, lubricant is supplied to the bearings between the last mentioned bushings and the shaft by means of ports 121 each communicating with the chamber 101 and delivering the lubricant therefrom to an annular chamber 122 surrounding each of the said bushings, the bushings being provided with one or more ports 123 for delivering the lubricant between themselves and the shaft.

At its inboard end, each housing 114 is provided with a deep cup or casing which is slotted at its inboard end for the reception of the lugs 23 on a ring 22. Each of the rings 22 is forced against a sealing surface 96ᶜ on a hub shoulder by a Duprene sealing ring 87 and a spring 30 similar to those shown in Fig. 20. The washers by which the opposed sides of the rings 87 are forced into engagement with the bottoms of the cups or casings and the rings 22 are shown as each being provided with a flange 124 adapted to overhang a radially outward edge of the sealing ring and with a radially inwardly projecting wall 125, the inner ends of which walls are directed toward each other, as shown at 126, thereby to provide seats for the opposite ends of the spring 30ª. In order to retain the sealing elements in assembled relation within their respective cups or casings, prior to the engagement of the rings 22 with the surfaces 96ᶜ, an outwardly extending groove 127 is provided adjacent to the inboard end of the segments 128ª of each cup or casing 128 for a snap ring 127ˣ. As is the case with preceding embodiments of my invention, each of the housings is provided with a radially outwardly projecting flange 129 between which and an annular surface 114ª on the pump body a washer 130 is interposed.

In both forms of my invention, shown in Figs. 24 and 25, a shaft is mounted within a pair of unit assemblies, each assembly comprising a housing having therein bearings and sealing elements, with means for distributing lubricant to said bearing elements; and the unit assemblies are each provided with means cooperating with a portion of the pump body to provide an effective seal between the exterior of each housing and the seat provided therefor by the body; furthermore, the pump body is provided with lubricant receptacles having ports whereby lubricant may be delivered through registering ports into chambers provided therefor in the housings, thereby to ensure efficient lubrication of the bearings.

Should the shaft shown in Fig. 25 and the bearings become worn, they can be conveniently and readily assembled and replaced by a shaft and unit bearings and sealing elements and at a comparatively small expense. In fact (as is the case with all embodiments of my invention) replacement units consisting of shafts having the unit bearing and sealing assemblies thereon can be kept in stock, rendering their replacement of correspondingly worn parts a comparatively cheap, inexpensive, and speedy operation. Where the shaft consists of two sections, as shown in Fig. 24, each unit will consist of a housing having therein a shaft section and the bearing and sealing elements; and original installations and replacements can be made with great facility.

Figures 26, 27, 30:
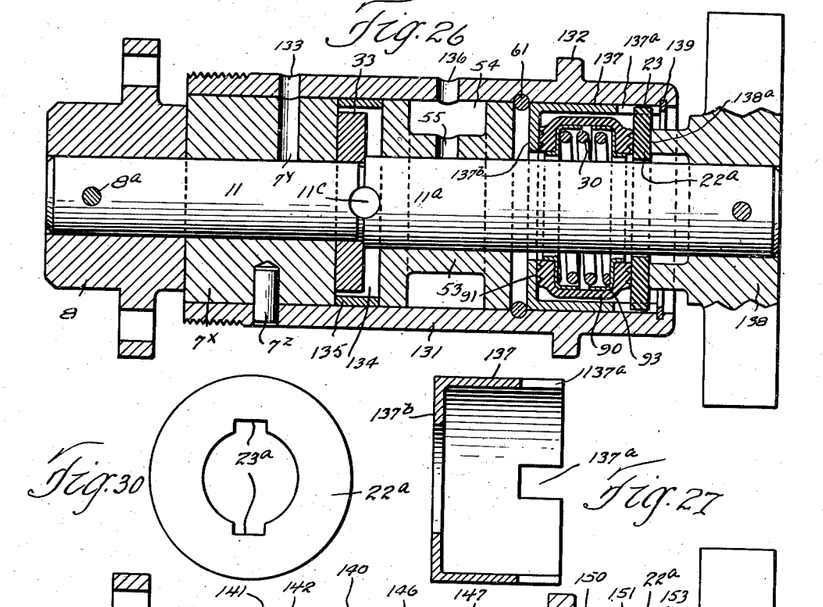
Fig. 26 a view, similar to Figs. 14 and 16, showing a further modification of my invention.
Fig. 27 a detail in section through the casing for the sealing elements in Fig. 26.
Fig. 30 a detail in end elevation of the inboard sealing ring shown in Fig. 28.

In Figs. 26 and 27, I have shown a further modification of my invention wherein the housing and the arrangement of the bearings and sealing members therein are generally similar to the construction and arrangement shown in Fig. 25. In this view, a single shaft and a single impeller or rotor are shown, although it is obvious that the same construction of unit can be used with the duplex arrangement shown in Fig. 25. The shaft shown in Fig. 26 is substantially identical with that shown in Figs. 1 and 6, and the parts thereof are designated by the same numerals which appear on the former figures. The shaft is shown as having applied thereto, within the housing 131, a bearing bushing 7ˣ similar to the bearing bushing shown in Fig. 6 and a spool-type bushing 53 which is shown as identical with that appearing in Fig. 9. The housing 131 is substantially identical with the one shown in Fig. 25, being provided with a radially extending flange 132 adapted to form a seal against the cooperating surface of the pump body, and having a port 133 adapted to communicate with a lubricant chamber in the pump body and to deliver lubricant through the port 7ʸ in the bushing 7ˣ, to and between the said bushing and the part 11 of said shaft. A chamber 134 is provided within the housing, between the bushing 7ˣ and 53; and the spacing ring 135 in said chamber serves to space the bushings apart. Within this chamber there is located a thrust ring having a driving connection with the shaft, 11 and 11ª, the construction of said ring and the driving connections being identical with those shown in preceding views, for instance, Figs. 1–5; hence the ring and the driving connections are identified by the same numerals which appear on corresponding parts in preceding views. The housing is provided with another port 136 adapted to supply lubricant from the chamber in the pump body to a chamber 54 formed between the end flanges of the bushing 53 and through a port 55 in the hub portion of said bushing through and between the said bushing and the shaft section 11ª. The bushing 53 is shown as retained in place by means of an expansible snap ring 61 seated in a groove in the housing. Abutting against the inboard side of said ring is a casing which contains the sealing elements. This casing is shown as comprising a cylindrical outer wall 137 and a radially inwardly extending wall 137ᵇ, the cylindrical wall being slotted, as at 137ª for the reception of the lugs 23 on the sealing ring 22. This sealing ring is pressed against the annular metal sealing surface 138ª on a shouldered extension of the hub of the rotor or impeller 138 by means of a spring 30 within a sealing ring substantially identical with that shown in Fig. 22 and designated by the same numerals employed on the former figure. Prior to their assembly with the ring 22 engaged by the sealing surface on the shoulder of the impeller or rotor hub, the sealing elements are retained within the casing 137 by means of the spring ring 139 mounted within the inboard end of the casing. The shaft is shown as provided with a hub 8 to which a driving pulley may be secured. The bushing 7ˣ is shown as secured to the housing 131 by a pin 7ᶻ. If desirable, all of the bushings shown herein may be pinned to the housings wherein they are mounted.

Figures 28, 29:
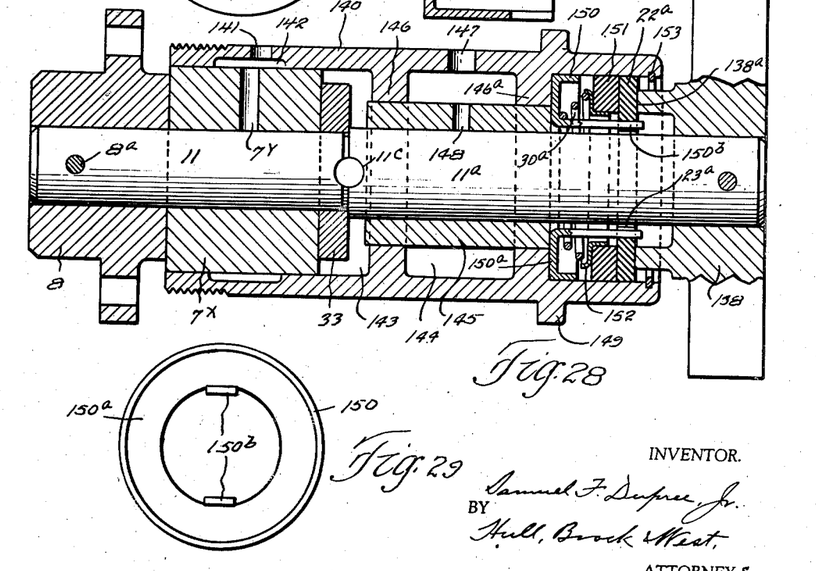
Fig. 28 a view, similar to Figs. 14, 16 and 26, showing a still further modification of my invention.
Fig. 29 a detail in end elevation of the casing for the sealing elements shown in Fig. 28.

In Figs. 28–30 there is shown a modified form of the unit illustrated in Figs. 26 and 27 and which differs therefrom in a slight change in the means for supplying lubricant to the outboard bushing 7ˣ; in employing a different form and mounting of the inboard bushing; and in employing a somewhat different construction and arrangement of sealing elements. The shaft 11, 11ª, is the same as shown in Fig. 26, as are also the impeller or rotor 138 with its shouldered sealing surface 138ª. The housing 140 has a port 141 for delivering lubricant from the chamber in the pump body to an annular distributing chamber 142 formed within the housing and surrounding the bushing 7ˣ and delivering lubricant through one or more ports 7ʸ. In this view, no spacing ring is employed, the thrust ring 33 being mounted in a chamber 143 and being driven from the shaft 11, 11ª in the same manner as in Fig. 26. Lubricant is supplied to an annular chamber 144 surrounding the bushing 145, which is mounted in cylindrical bores formed within the ribs 146, 146ª. The chamber 144 receives lubricant from the lubricant chamber in the pump body by means of a port 147, the lubricant so received being delivered between the shaft and the bushing by means of one or more ports 148.

The housing is provided with the radial flange 149, corresponding to the flange 132 in Fig. 26. The inboard end of the housing contains the sealing elements comprising the ring 22ª, which is substantially identical with the rings 22 referred to hereinbefore, but which is provided with slots 23ᵃ extending radially outwardly from the interior thereof and adapted to receive retaining lugs 150ᵇ extending from the inner periphery of the radially extending wall 150ᵃ of the casing 150, which is fitted within the chamber at the inboard end of the housing. The ring 22ᵃ is forced against the sealing surface on the shoulder 138ᵃ by means of the ring 151, which may be of any desirable deformable and resilient material (such as "Duprene" cork or "Garlock") by means of the annular ring 152 and the spring 30ᵃ. The inner wall of the ring 152 extends within the inner cylindrical wall of the ring 151, thereby to prevent the same from being pressed inwardly to an undesirable extent. The inboard end of the housing is provided with an outwardly expansible snap ring 153, which serves to retain all of the sealing elements within the housing, prior to the engagement of the ring 22ᵃ with the sealing surface on the shoulder 138ᵃ.

The advantages of quickness, convenience and ease of assembling and replacement can be realized by all of the embodiments of my invention disclosed herein. Furthermore, as pointed out hereinbefore, the parts of these unit assemblies can be fitted with extreme accuracy, rendering them more satisfactory as original installations than assemblies now on the market with which I am familiar, and with the added advantages of quick and convenient replacement which have been pointed out hereinbefore. Still further, means are provided for the efficient lubrication of the bearings; and the various types of bearing and sealing elements and shafts shown and described herein may be used in connection with any of the types of housings shown and described herein.

Having thus described my invention, what I claim is:

1. A unit for use in connection with the bodies of pumps, said unit comprising a housing adapted to be removably fitted within a seat provided therefor in a pump body, bearings within said housing, a shaft within said bearings, a sealing ring within said housing surrounding said shaft, a spring within said housing for exerting pressure against said ring longitudinally of said shaft, a sealing element having an annular surface surrounding said shaft within said housing and adapted to be engaged by the said ring, and means including said shaft for imparting relative rotary movement between the said ring and the said sealing element.

2. A unit for use in connection with the bodies of pumps, said unit comprising a housing adapted to be removably fitted within a seat provided therefor in a pump body, bearings within said housing, a shaft within said bearings, a seal within said housing surrounding said shaft and comprising a sealing ring and a spring for exerting pressure against said ring longitudinally of said shaft, the said housing having an annular shoulder within the inboard end thereof surrounding the said shaft and adapted to be engaged by said sealing ring and a driving connection between the said shaft and the said sealing ring.

3. A unit for use in connection with the bodies of pumps, the said unit comprising a housing adapted to be removably fitted within a seat provided therefor in a pump body, bearings within said housing, a shaft within said bearings, a casing within said housing surrounding said shaft, a seal within said casing and including a ring and a spring for exerting pressure against said ring longitudinally of said shaft, the said housing having an annular sealing surface surrounding said shaft and adapted to be engaged by the said ring, the said ring being connected with the said casing, thereby to be non-rotatable with respect thereto, and means including said shaft for imparting relative rotary movement between the said casing and the said sealing surface.

4. A unit for use in connection with the bodies of pumps, the said unit comprising a housing adapted to be removably fitted within a seat provided therefor in a pump body, bearings within said housing, a shaft within said bearings, sealing elements within the inboard end of the housing and including a ring and a spring for exerting a pressure against said ring longitudinally of said shaft, a rotor secured to said shaft and having a metallic shoulder surrounding said shaft and projecting into the inboard end of said housing and engaged by the said ring, and means holding the said ring against rotation within said housing.

5. A unit for use in connection with the bodies of pumps, the said unit comprising a housing adapted to be removably fitted within a seat provided therefor in a pump body, bearings in said housing, a shaft in said bearings, the said housing having a chamber formed within the inboard end thereof, the inboard end of said chamber having a radially inwardly projecting wall provided with an annular shoulder projecting in an outboard direction from the said wall into the said chamber and surrounding the said shaft, a casing within said chamber, a sealing ring within said casing and surrounding said shaft, a second sealing ring within said casing engaging the outboard face of the first mentioned sealing ring, a spring within said casing and pressing a portion of the second sealing ring against the outboard face of the first mentioned sealing ring, and means securing the first mentioned sealing ring to said casing.

6. A unit for use in connection with a pump body having a chamber for the circulation of fluid therethrough and having a seat extending from the outboard end thereof to said chamber, said unit comprising a housing adapted to be removably mounted in said seat, bearings in said housing, a shaft in said bearings, a rotor on said shaft within the said chamber, the said housing having a chamber within its inboard end, a sealing element having an annular sealing surface surrounding said shaft within said chamber, a sealing ring in said chamber surrounding said shaft and spaced therefrom and adapted to engage said annular surface, a spring within said chamber for pressing the said ring into engagement with the said annular surface, and a ring surrounding the said shaft within the said chamber and interposed between the said spring and the first mentioned ring and preventing access of fluid from the first mentioned chamber to the said spring.

7. A unit for use in connection with the bodies of pumps, the said unit comprising a housing adapted to be removably fitted within a seat provided therefor in a pump body, bearings in said housing, a shaft in said bearings, a casing within said housing surrounding the said shaft, sealing elements in said casing, the said elements comprising a sealing ring surrounding said shaft and spaced therefrom, a second sealing ring surrounding the said shaft and having a radially extending portion adapted to engage the first mentioned ring and a spring within said casing pressing the said portion of the second ring against the first ring, a sealing element surrounding the said shaft and having an annular seating surface within the housing adapted to engage the first mentioned sealing ring and to move said ring in a direction to compress said spring, means carried by said casing adapted to be engaged by the first mentioned sealing ring and to retain the sealing elements in place within the casing prior to the engagement of the first mentioned sealing ring by the said seating surface, means connecting the first mentioned sealing ring with the said casing, and means including the said shaft for imparting relative rotary movement between the said casing and the said seating surface.

8. A unit for use in connection with the bodies of pumps, the said unit comprising a housing adapted to be removably fitted within a seat provided therefor in a pump body, bearings in said housing, a shaft in said bearings, sealing elements in the inboard end of said housing, the said elements comprising a sealing ring surrounding said shaft and spaced therefrom, a second sealing ring surrounding the said shaft and having a radially extending portion adapted to engage the first mentioned ring and a spring within said housing pressing the said portion of the second ring against the first ring, and a removable retaining ring within said housing adapted to be engaged by the first mentioned sealing ring and to retain the sealing elements in place within the housing.

9. A unit for use in connection with the bodies of pumps, the said unit comprising a housing adapted to be removably fitted within a seat provided therefor in a pump body, bearings in said housing, a shaft in said bearings, the said housing having a chamber at its inboard end and having at the inboard end of the said chamber an annular shoulder surrounding the shaft and extending in an outboard direction within the said chamber, a casing secured to said shaft within said chamber, a sealing ring spaced from said shaft within said casing and having a plurality of radially inwardly extending slots in its outer edge, the casing having fingers extending through said slots and bent radially inwardly at their inboard ends, a second sealing ring surrounding the shaft located between the first mentioned ring and the bottom of the casing and having a radially extending portion adapted to engage the first mentioned ring, and a spring interposed between the said portion of the second sealing ring and the bottom of the casing.

10. A unit for use in connection with the bodies of pumps, the said unit comprising a housing adapted to be removably fitted within a seat provided therefor in a pump body, bearings in said housing, a shaft in said bearings, the said housing having a chamber at its inboard end, a casing within the said chamber, an annular shoulder projecting into said chamber, a sealing ring within said casing and adapted to engage the said shoulder with its inboard face, the said casing having one or more extensions slidably engaging the said sealing ring, a second sealing ring within said casing, and a spring within said casing engaging the second sealing ring for forcing the same and the first sealing ring toward the said shoulder.

SAMUEL F. DUPREE, Jr.